(12) United States Patent
Chinda (10) Patent No.: US 8,824,609 B2
(45) Date of Patent: Sep. 2, 2014

(54) RECEIVING DEVICE AND RECEIVING METHOD

(75) Inventor: Takeshi Chinda, Kobe (JP)

(73) Assignee: Fujitsu Ten Limited, Kobe (JP)

( * ) Notice: Subject to any disclaimer, the term of this patent is extended or adjusted under 35 U.S.C. 154(b) by 160 days.

(21) Appl. No.: 13/542,968

(22) Filed: Jul. 6, 2012

(65) Prior Publication Data

US 2013/0083870 A1    Apr. 4, 2013

(30) Foreign Application Priority Data

Sep. 30, 2011    (JP) .................................. 2011-218293

(51) Int. Cl.
*H04L 25/08*    (2006.01)
*H04L 27/26*    (2006.01)

(52) U.S. Cl.
CPC .................................. *H04L 27/2649* (2013.01)
USPC ........... 375/346; 375/260; 375/285; 375/340; 455/501; 455/103; 370/278

(58) Field of Classification Search
CPC .. H04B 1/1027; H04B 1/1036; H04B 1/0475; H04B 1/10; H04B 15/00; H04L 25/0328; H04L 25/03821; H04L 27/2691

USPC .......... 375/260, 346, 285, 340; 455/501, 103; 370/278

See application file for complete search history.

(56) References Cited

U.S. PATENT DOCUMENTS 8,000,417 B1 *    8/2011    Zhidkov et al. ................ 375/346

FOREIGN PATENT DOCUMENTS

JP    A-2000-151542    5/2000

* cited by examiner

*Primary Examiner* — Leila Malek
(74) *Attorney, Agent, or Firm* — Oliff PLC (57) ABSTRACT

A synthesizing unit of a receiving device according to an embodiment synthesizes fixed components, which are fixed between carriers of an effective symbol, included in inter-carrier interference (ICI) in a broadcast signal on which fast Fourier transform (FFT) has been performed in view of an adding position of the guard interval in the broadcast signal and ICI in a broadcast signal on which FFT has been performed without considering the adding position, according to an addition amount of the guard interval. The ICI calculating unit calculates ICI to be removed from the broadcast signal based on the fixed component synthesized by the synthesizing unit.

5 Claims, 3 Drawing Sheets

RECEIVING DEVICE AND RECEIVING METHOD

CROSS-REFERENCE TO RELATED APPLICATION

This application is based upon and claims the benefit of priority from Japanese Patent Application No. 2011-218293, filed on Sep. 30, 2011, the entire contents of which are incorporated herein by reference.

BACKGROUND OF THE INVENTION

1. Field of the Invention

An embodiment of the disclosure relates to a receiving device and a receiving method.

2. Description of the Related Art

In recent years, broadcast signals used in digital television broadcasting conform to OFDM (Orthogonal Frequency Division Multiplexing) scheme. The OFDM scheme is a technique of effectively transmitting data using a limited frequency band by transmitting effective symbols including broadcast content in a parallel way through a plurality of carriers having phases orthogonal to each other.

A receiving device that receives a broadcast signal according to the OFDM scheme acquires a symbol corresponding to data from the broadcast signal by performing FFT (fast Fourier transform) on the received broadcast signal, and reproduces broadcast content by performing OFDM demodulation on the acquired symbol.

Meanwhile, a broadcasting station that transmits a broadcast signal according to the OFDM scheme adds a guard interval copied from a tail part of each effective symbol to a head part of each effective symbol and then transmits each symbol in order to improve immunity to a multipath delay.

As described above, the same data (symbol) as a part of an effective symbol is included in the guard interval. Based on this, a technique of improving a receiving characteristic by synthesizing the guard interval with the effective symbol has been proposed.

For example, a receiving device disclosed in JP2000-151542A improves a receiving characteristic by delaying a guard interval by a time corresponding to the duration of an effective symbol and then adding/synthesizing the guard interval to/with a tail part of an effective symbol before performing FFT on a received broadcast signal.

Meanwhile, in a receiving device for a vehicle, when a broadcast signal is received during high-speed movement, orthogonality of a carrier collapses due to Doppler shift, causing inter-carrier interference. When the inter-carrier interference occurs, it is difficult for the receiving device to acquire a valid symbol, and thus a receiving characteristic degrades.

For this reason, for example, a receiving device improves a receiving characteristic by calculating the ICI based on a time variation of a transmission channel response of a received broadcast signal and then removing the ICI from the broadcast signal.

Specifically, the receiving device acquires an SP (scattered pilot) signal from the broadcast signal which has been subjected to the FFT. Then, based on the acquired SP signal, the receiving device estimates an original transmission channel response of the broadcast signal and estimates a time variation of the transmission channel response of the received broadcast signal.

Then, the receiving device calculates the ICI based on a difference between the estimated original transmission channel response of the broadcast signal and the time variation of the actual transmission channel response, and removes the calculated the ICI from the broadcast signal, thereby improving the receiving characteristic.

However, when the technique (hereinafter, referred to as a "guard adding technique") of adding/synthesizing the guard interval to/with the effective symbol is used together with the technique of removing the ICI, the calculation accuracy of the ICI is lowered.

Specifically, in the guard adding technique, when the guard interval is synthesized with the effective symbol, the guard interval is delayed by a time corresponding to the duration of the effective symbol and then synthesized with the effective symbol before the FFT is performed.

However, in the technique of removing the ICI, the ICI is calculated based on the FFT-processed broadcast signal, and influence caused by delaying the guard interval before the FFT is performed is reflected in the time variation of the transmission channel response used to calculate the ICI.

For this reason, when the guard adding technique is used together with the technique of removing the ICI, it is difficult to accurately calculate a time variation related to the transmission channel response of the received broadcast signal, whereby the calculation accuracy of the ICI is lowered.

Thus, how to implement a receiving device and a receiving method which are capable of improving the calculation accuracy of the ICI while using the guard adding technique together with the technique of removing the ICI has become a big issue.

SUMMARY OF THE INVENTION

A receiving device according to an embodiment includes a receiving unit, a guard adding unit, a FFT unit, a synthesizing unit, and an ICI calculating unit. The receiving unit receives a broadcast signal in which a guard interval copied from a tail part of an effective symbol including broadcast content is added to a head part of the effective symbol. The guard adding unit adds the guard interval included in the broadcast signal received by the receiving unit to the tail part of the broadcast signal. The FFT unit performs FFT on the broadcast signal to which the guard interval is added. The synthesizing unit that synthesizes fixed components, which are fixed between carriers of the effective symbol, included in ICI in a broadcast signal on which FFT has been performed in view of an adding position of the guard interval in the broadcast signal and ICI in a broadcast signal on which FFT has been performed without considering the adding position, according to an addition amount of the guard interval. The ICI calculating unit calculates ICI to be removed from the FFT-processed broadcast signal based on the fixed component synthesized by the synthesizing unit.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Hereinafter, an embodiment of receiving device and a receiving method disclosed in the present disclosure will be described in detail with reference to the accompanying drawings. In the following, a receiving device that receives a broadcast signal for digital television broadcasting to which the OFDM (Orthogonal Frequency Division Multiplexing) scheme is applied is described as an example of a receiving device.

Figure 1:
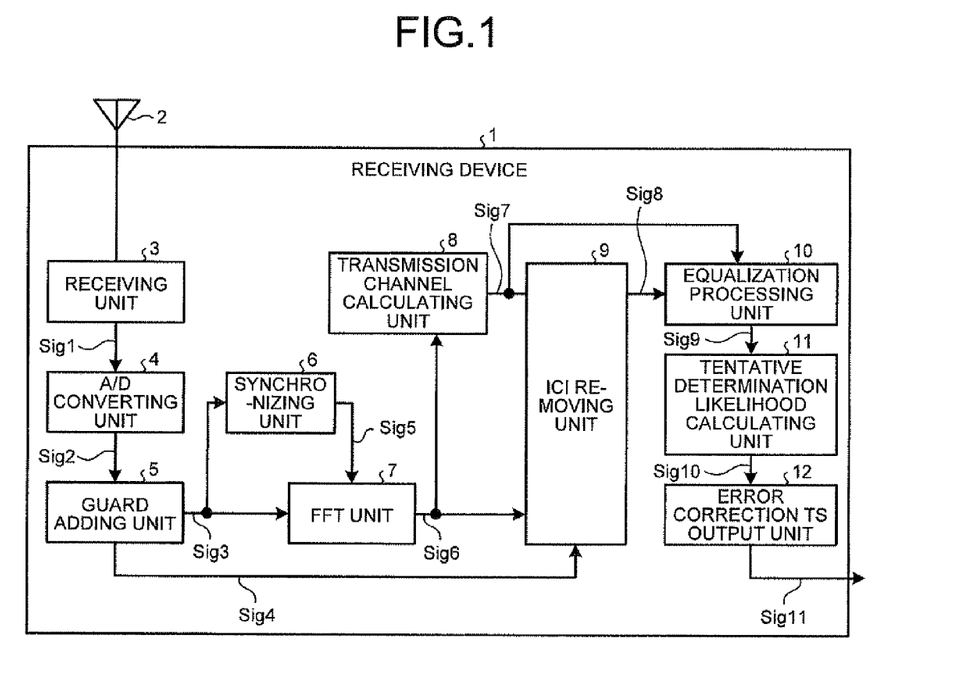
FIG. 1 is a schematic diagram illustrating a configuration of a receiving device according to an embodiment.

FIG. 1 is a schematic diagram illustrating a configuration of a receiving device 1 according to an embodiment. FIG. 1 illustrates only components necessary to describe a feature of the receiving device 1, and general components are not illustrated.

The receiving device 1 illustrated in FIG. 1 is a device that receives a broadcast signal including a duration of an effective symbol containing broadcast content and a duration of a guard interval which is copied from a tail part of the effective symbol and added to a head part of the duration of the effective symbol. The receiving device 1 executes predetermined signal processing on the received broadcast signal, and outputs the signal-processed broadcast signal to be reproduced by an output device such as a display device or a speaker (not illustrated).

Specifically, as illustrated in FIG. 1, the receiving device 1 includes an antenna 2, a receiving unit 3, an A/D (analog/digital) converting unit 4, a guard adding unit 5, a synchronizing unit 6, an FFT (Fast Fourier Transform) unit 7, and a transmission channel calculating unit 8.

The receiving device 1 further includes an ICI removing unit 9, an equalization processing unit 10, a tentative determination likelihood calculating unit 11, and an error correction TS (Transport Stream) output unit 12.

The receiving unit 3 is a tuner that receives the broadcast signal through the antenna 2 at a predetermined frequency band, and detects and amplifies the received broadcast signal. The receiving unit 3 outputs the detected and amplified analog broadcast signal Sig1 to the A/D converting unit 4.

The A/D converting unit 4 is a processing unit that converts the analog broadcast signal Sig1 input from the receiving unit 3 into a digital broadcast signal Sig2, and outputs the digital broadcast signal Sig2 to the guard adding unit 5. Here, the digital broadcast signal Sig2 output from the A/D converting unit 4 is the broadcast signal Sig2 in the time domain.

The guard adding unit 5 is a processing unit that adds/synthesizes a guard interval, which is included in the broadcast signal Sig2 input from the A/D converting unit 4, to/with the tail part of the broadcast signal. Sig2 which is the copy source of the guard interval. The guard adding unit 5 outputs a broadcast signal Sig3 which has been subjected to a guard addition process to the synchronizing unit 6 and the FFT unit 7.

Further, the guard adding unit 5 outputs a signal Sig4, which represents an adding position (hereinafter, referred to as a "guard adding position win") of the guard interval added to the tail part of the broadcast signal Sig2 in the broadcast signal Sig1, to the ICI removing unit 9.

In the following, the process of adding the guard interval through the guard adding unit 5 is referred to as a "guard addition process." An example of the guard addition process will be described later with reference to FIGS. 2A and 2B together with a description of an operation of the FFT unit 7.

The synchronizing unit 6 is a processing unit that performs symbol synchronization of detecting a start position of the effective symbol in the broadcast signal Sig3 which has been subjected to the guard addition process, and outputs a signal Sig5 representing the detected position (a delimiter between symbols in a data string) of the effective symbol to the FFT unit 7. Further, the synchronizing unit 6 performs clock synchronization of synchronizing a reference clock of a transmitting device (not illustrated) that has transmitted the broadcast signal Sig3 with a reference clock of the receiving device 1.

The FFT unit 7 is a processing unit that performs the FFT on the broadcast signal Sig3 input from the guard adding unit 5 based on the signal Sig5 representing the start position of the effective symbol input from the synchronizing unit 6, and transforms the broadcast signal Sig3 in the time domain into a broadcast signal Sig6 in the frequency domain.

Specifically, the FFT unit 7 performs the FFT on the broadcast signal Sig3 input from the guard adding unit 5, and acquires a symbol (a signal point) corresponding to data included in the broadcast signal Sig3.

Then, the FFT unit 7 maps each acquired symbol of the broadcast signal Sig3 with a receiving point in a constellation represented by an in-phase component axis and a quadrature-component axis. Each symbol mapped with the constellation is the broadcast signal Sig6 which has been subjected to the FFT.

Then, the FFT unit 7 outputs the generated broadcast signal Sig6 to the transmission channel calculating unit 8 and the ICI removing unit 9. The transmission channel calculating unit 8 calculates a transmission channel response Sig7 of the broadcast signal Sig6 based on the SP (Scattered Pilot) signal included in the broadcast signal Sig6 input from the FFT unit 7, and outputs the calculated transmission channel response Sig7 to the ICI removing unit 9 and the equalization processing unit 10.

Here, the guard addition process performed by the guard adding unit 5 will be described with reference to FIGS. 2A and 2B together with a description of an operation of the FFT unit 7. FIGS. 2A and 2B are schematic diagrams illustrating operations of the guard addition process and the FFT unit 7 according to an embodiment.

Figure 2A:
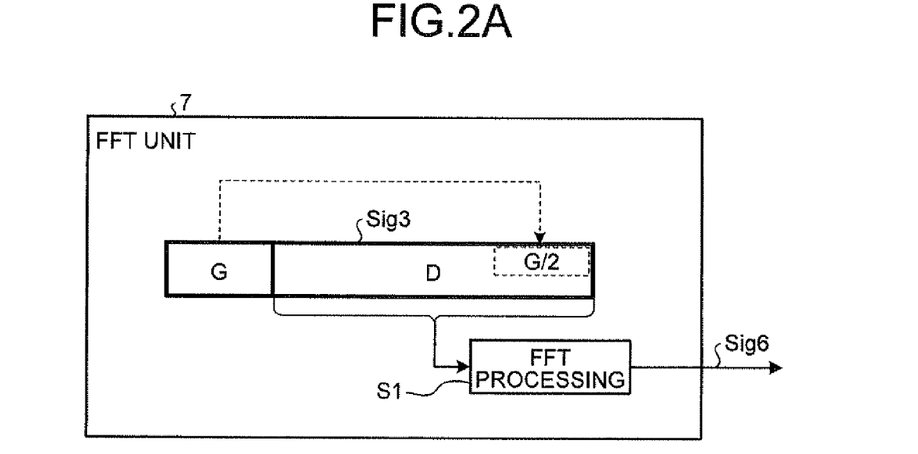
FIGS. 2A and 2B are schematic diagrams illustrating a guard addition process and an operation of an FFT unit according to an embodiment.

As illustrated in FIG. 2A, the FFT unit 7 receives the broadcast signal Sig3, which has been subjected to the guard addition process, from the guard adding unit 5. For example, the guard adding unit 5 generates the broadcast signal Sig3 by the following processing.

Specifically, the guard adding unit 5 delays a guard interval G added to a head part of an effective symbol. D by a time corresponding to a duration length of the effective symbol D as indicated by a dashed arrow in FIG. 2A.

Subsequently, the guard adding unit 5 performs the guard addition process such that the effective symbol D is synthesized with the guard interval G by adding the tail part of the effective symbol D before delay to the delayed guard interval G.

In the above-described way, the guard adding unit 5 generates the broadcast signal Sig3 that includes, for example, data of the copy source of the guard interval G in the tail part of the effective symbol D and data of the guard interval G by 50% as illustrated in FIG. 2A. The ratio of the guard interval G, which is to be subjected to the guard addition process, to the tail part of the effective symbol D is not limited to 50% and can be appropriately changed.

As described above, the receiving device 1 performs the guard addition process through the guard adding unit 5. Thus, when an error occurs in the tail part of the received effective symbol D, data can be complemented using the data of the guard interval G, so that the receiving characteristic is improved.

Then, upon receiving the broadcast signal Sig3 which has been subjected to the guard addition process, the FFT unit 7 performs the FFT process on the effective symbol D part in the broadcast signal Sig3 (step S1), and outputs the FFT-processed broadcast signal Sig6 to the transmission channel calculating unit 8 and the ICI removing unit 9.

Here, the FFT-processed broadcast signal Sig3 is a signal in which the data of the guard interval G occupies 50% in the tail part of the effective symbol D as described above. Thus, the broadcast signal Sig3 can be regarded as a signal obtained by arithmetically averaging a broadcast signal, to which the guard interval G is not added, illustrated in the upper part of FIG. 2B and a broadcast signal, to which the guard interval G is added, illustrated in the lower part of FIG. 2B.

Figure 2B:
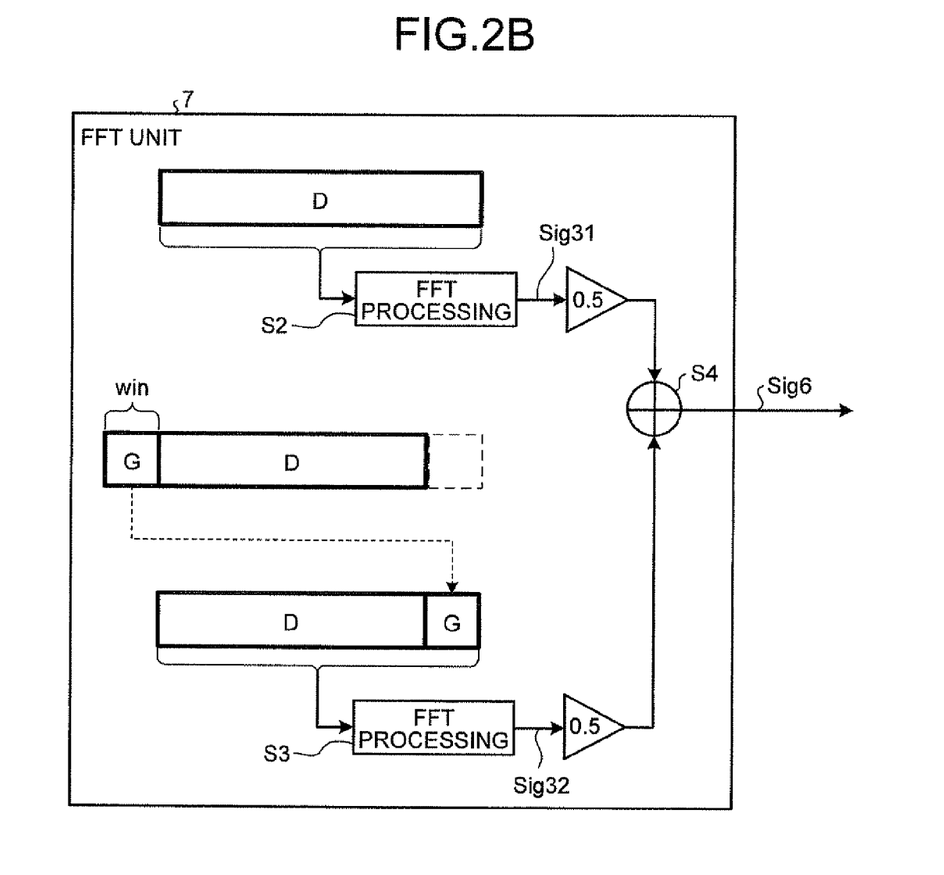

Thus, the process of performing the FFT on the broadcast signal Sig3 is equivalent to a process of performing the FFT on the broadcast signal illustrated in the upper part of FIG. 2B (step S2), performing the FFT on the broadcast signal illustrated in the lower part of FIG. 2B (step S3), and arithmetically averaging broadcast signals Sig31 and Sig32 which have been subjected to the FFT (step S4).

An arithmetic process of performing the FFT on the broadcast signal illustrated in the upper part of FIG. 2B is equivalent to an arithmetic process of regarding the broadcast signal Sig3 as a signal which has not been subjected to the guard addition process and thus performing the FFT without considering the guard adding position win.

This arithmetic process can be expressed by a formula as follows. Specifically, when the transmission channel response Sig7 of the FFT-processed broadcast signal Sigh is assumed to change with respect to the symbol time T of the effective symbol D in a linear function manner, the broadcast signal illustrated in the upper part of FIG. 2B is expressed by the following Expression (1).

[Expression 1]

$$y\_t(i) = \sum_{n=0}^{N-1} a_n(h_n + \Delta h_n iT) e^{j2\pi n \frac{1}{N}} \quad (1)$$

Here, i: time sample number n: carrier number

N: number of FFT stages

T: symbol time y_t: receiving signal (time domain)

y_f: receiving signal (frequency domain)

$a_n$: transmitting signal (n-th carrier)

$h_n$: transmission channel response (n-th carrier)

When DFT (Discrete Fourier Transform) is performed on Expression (1) to which m is assigned in order to perform the FFT on the above signal, the DFT-processed broadcast signal Sig31 is expressed by the following Expression (2).

[Expression 2]

$$\begin{aligned} Sig31: y\_f(m) &= \frac{1}{N} y\_t(i) e^{-j2\pi n \frac{1}{N}} \quad (2) \\ &= \sum_{i=0}^{n-1} a_n h_n \left( \frac{1}{N} \sum_{i=0}^{N-1} e^{j2\pi(n-m)\frac{i}{N}} \right) + \sum_{n=0}^{N-1} a_n \Delta h_n T \\ &\quad \left( \frac{1}{N} \sum_{i=0}^{N-1} e^{j2\pi(n-m)\frac{i}{N}} \right) \\ &= a_m h_m + \frac{1}{N} \sum_{n=0}^{N-1} a_n \Delta h_n T \zeta_{n-m} \end{aligned}$$

Here, n, m: carrier number

Here, a first term in the last row of Expression (2) represents a component that does not depend a time variation of the transmission channel response Sig7 in the broadcast signal Sig31 which has been subjected to the FFT (step S2), that is, a signal component including no ICI. However, a second term in the last row of Expression (2) represents ICI (hereinafter, referred to as "ICI1") which is caused by the time variation of the transmission channel response Sig7 and included in the broadcast signal Sig31.

Meanwhile, an arithmetic process of performing the FFT on the broadcast signal illustrated in the lower part of FIG. 2B is equivalent to an arithmetic process of regarding the broadcast signal Sig3 as a signal which has been subjected to the guard addition process and thus performing the FFT while considering the guard adding position win.

Specifically, the guard interval G in the broadcast signal illustrated in the lower part of FIG. 2B is data which has been originally added to the head part of the effective symbol D. In other words, in the broadcast signal illustrated in the lower part of FIG. 2B, the guard interval G is arranged at the position corresponding to a reception time different from an original reception time.

For this reason, when the transmission channel response Sig7 of the FFT-processed broadcast signal Sigh is assumed to change with respect to the reception time T of the effective symbol in a linear function manner, if the FFT is performed on the broadcast signal illustrated in the lower part of FIG. 2B without considering the guard adding position win, an error occurs in ICI.

In other words, when the FFT is performed on the broadcast signal illustrated in the lower part of FIG. 2B without considering the guard adding position win, the FFT is performed under determination that the part of the guard interval G is received at a reception time different from an actual reception time. As a result, ICI included in the FFT-processed broadcast signal Sig32 becomes inaccurate ICI in which the error of the reception time of the guard interval G is reflected.

Thus, when the FFT is performed on the broadcast signal illustrated in the upper part of FIG. 2B, the reception time of the guard interval G, that is, an arithmetic process of performing the FFT while considering the guard adding position win representing the adding position of the guard interval G in the broadcast signal Sig1 at the time of reception is necessary.

This arithmetic process can be expressed by a formula as follows. Specifically, when the transmission channel response Sig7 of the FFT-processed broadcast signal Sig6 is assumed to change with respect to the symbol time T of the effective symbol D in a linear function manner, the broadcast signal to which the guard interval G illustrated in the lower part of FIG. 2B is added is expressed by the following Expression (3).

[Expression 3]

$$y\_t(i) = \sum_{n=0}^{N-1} a_n f(i) e^{j2\pi n \frac{1}{N}} \quad (3)$$

Here, $$f(i) = h_n + \Delta h_n i T (0 \le i \le N - \text{win} - 1)$$
$$= h_n + \Delta h_n (i - N) T (N - \text{win} \le i \le N - 1)$$

win: guard adding position

As described above, in Expression (3), the broadcast signal illustrated in the lower part of FIG. 2B is classified by a time sample number i in which the effective symbol D and the guard interval G is received in view of the guard adding position win.

When the DFT is performed on Expression (3) to which m is assigned in order to perform the FFT on the broadcast signal, the DFT-processed broadcast signal Sig32 is expressed by the following Expression (4).

[Expression 4]

$$Sig32: \ y\_f(m) = \frac{1}{N} \sum_{i=0}^{N-\text{win}-1} \sum_{n=0}^{N-1} a_n (h_n + \Delta h_n i T) e^{j2\pi(n-m)\frac{i}{N}} + \quad (4)$$

$$\frac{1}{N} \sum_{i=N-\text{win}}^{N-1} \sum_{n=0}^{N-1} a_n (h_n + \Delta h_n (i-N) T) e^{j2\pi(n-m)\frac{i}{N}}$$

Further, when i' and i" are represented by i'=i+win and i"=i+win, respectively, in Expression (4), the broadcast signal Sig32 is expressed by the following Expression (5).

[Expression 5]

$$Sig32: \ y\_f(m) = \frac{1}{N} \sum_{i'=\text{win}}^{N-1} \sum_{n=0}^{N-1} a_n (h_n + \Delta h_n (i' - \text{win}) T) e^{j2\pi(n-m)\frac{i'-\text{win}}{N}} + \quad (5)$$

$$\frac{1}{N} \sum_{i''=0}^{\text{win}-1} \sum_{n=0}^{N-1} a_n (h_n + \Delta h_n (i'' - \text{win}) T) e^{j2\pi(n-m)\frac{i''-\text{win}+N}{N}} +$$

$$\frac{1}{N} \sum_{i=0}^{N-1} \sum_{n=0}^{N-1} a_n (h_n + \Delta h_n (i - \text{win}) T) e^{j2\pi(n-m)\frac{i-\text{win}}{N}} =$$

$$a_m (h_m - \Delta h_m \text{win} T) + \frac{1}{N} \sum_{n=0}^{N-1} a_n \Delta h_n T \zeta_{n-m} e^{-j2\pi \frac{\text{win}}{N}} e^{j2\pi m \frac{\text{win}}{N}}$$

Here, a first term in the last row of Expression (5) represents a signal component of the broadcast signal Sig31 that does not depend on the time variation of the transmission channel response, that is, a signal component including no ICI. A second term in the last row of Expression (5) represents ICI (hereinafter, referred to as "ICI2") which is caused by the time variation of the transmission channel response and included in the broadcast signal Sig32.

For this reason, when the above-described arithmetic process is performed, the FFT unit 7 outputs the broadcast signal Sig6 obtained by arithmetically averaging the broadcast signal Sig31 and the broadcast signal Sig32. In other words, the FFT unit 7 outputs the broadcast signal Sigh including ICI1 and ICI2.

As described above, when the broadcast signal Sig6 includes ICI1 and ICI2, there occurs a problem in that the receiving characteristic is lowered since it is difficult to acquire a valid symbol from each carrier of the broadcast signal Sig6. In order to prevent the occurrence of the problem, the receiving device 1 includes the ICI removing unit 9.

The ICI removing unit 9 is a processing unit that removes the ICI1 and ICI2 from the broadcast signal Sig6 input from the FFT unit 7, and then outputs a broadcast signal Sig8 including no the ICI1 and ICI2 to the equalization processing unit 10 (see FIG. 1).

Here, for example, ICI which has to be removed from the FFT-processed broadcast signal Sig6 may be calculated such that the ICI removing unit 9 calculates the ICI by individually calculating each of the ICI1 and the ICI2 and arithmetically averaging the ICI1 and the ICI2 may be used as a method of calculating ICI.

In this way, by individually calculating the ICI1 and the ICI2 and then arithmetically averaging the ICI1 and the ICI2, it is possible to prevent influence caused by delaying the guard interval G at the time of the guard addition process from being reflected in ICI.

Thus, when the ICI which has to be removed from the FFT-processed broadcast signal Sigh is calculated by the above-mentioned method, the calculation accuracy can be improved using the guard adding technique and the technique of removing the ICI together.

Here, an example in which the ICI is calculated by individually calculating the ICI1 and the ICI2 and arithmetically averaging the ICI1 and the ICI2 will be described in further detail. In this case, ICI1($m$) which a symbol of a carrier number n receives from a symbol of a carrier number m is represented by Expression (6) based on the second term in the last row of Expression (2).

Further, ICI2($m$) which the symbol of the carrier number n receives from the symbol of the carrier number m is represented by Expression (7) based on the second term in the last row of Expression (5).

[Expression 6]

$$ICI1(m) = \frac{1}{N} \sum_{n=0}^{N-1} a_n \Delta h_n T \zeta_{n-m} \quad (6)$$

$$ICI2(m) = \frac{1}{N} \sum_{n=0}^{N-1} a_n \Delta h_n T \zeta_{n-m} e^{-j2\pi n \frac{\text{win}}{N}} e^{j2\pi m \frac{\text{win}}{N}} \quad (7)$$

$$= \frac{1}{N} \sum_{n=0}^{N-1} a_n \Delta h_n T \zeta_{n-m} e^{-j2\pi(n-m)\frac{\text{win}}{N}}$$

When the ICI1($m$) and the ICI2($m$) are individually calculated as described above, the ICI removing unit 9 classifies the FFT-processed broadcast signal Sigh into a broadcast signal Sig31 on which the FFT has been performed without considering the guard adding position win and a broadcast signal Sig32 on which the FFT has been performed in view of the guard adding position win, and then performs processing.

In other words, the ICI removing unit 9 performs a calculation of each of Expression (6) and Expression (7), and calculates an arithmetically average of both calculation results as ICI to remove. Through this operation, the ICI removing unit 9 can calculate ICI from which an error caused by delaying the guard interval G at the time of the guard addition process is excluded with a high degree of accuracy.

However, in the above-described configuration, as described above, it is necessary to individually calculate the ICI1($m$) and the ICI2($m$). Thus, in the above-described configuration, a circuit configuration of an arithmetic circuit is complicated and so the circuit size increases, and it is difficult to implement the ICI removing unit 9 of large scan integration (LSI).

In this regard, in the present embodiment, the ICI removing unit 9 is configured to calculate the ICI which has to be removed from the FFT-processed broadcast signal Sig6 without individually calculating the ICI1($m$) and the ICI2($m$).

Here, the details of a calculation method of calculating the ICI which has to be removed from the FFT-processed broadcast signal Sig6 without individually calculating the ICI1($m$) and the ICI2($m$) will be described.

First, when Expression (6) for calculating the ICI1($m$) is compared with Expression (7) for calculating ICI2($m$), both formulas have a common variation component that changes for each carrier of the effective symbol D and a non-common fixed component which is fixed between carriers.

Specifically, $a_n$ in Expression (6) and Expression (7) is a transmission signal of an n-th carrier, and is variation component that changes depending on the carrier number n. Further, $\Delta h_n$ is a time variation of a transmission channel response in the n-th carrier, and is a variation component that changes depending on the carrier number n. N is an integer representing the number of FFT stages. T is an integer representing a symbol time (a time necessary to receive each symbol).

However, a function behind T in Expression (6) and Expression (7) is a fixed component which is fixed for each difference between carrier numbers, that is, between carriers. The ICI that has to be removed from the FFT-processed broadcast signal Sig6 is a calculation result of arithmetically averaging the ICI1($m$) calculated by Expression (6) and the ICI2($m$) calculated by Expression (7).

Thus, using the variation component as a common term, a formula for calculating the ICI that has to be removed from the FFT-processed broadcast signal Sig6 is represented by the following Expression (8).

[Expression 7]

$$ICI = \frac{ICI1 + ICI2}{2} \quad (8)$$

$$= \frac{1}{N}\sum_{n=0}^{N-1} a_n \Delta h_n T \frac{\zeta_{n-m} + \zeta_{n-m} e^{-j2\pi(n-m)\frac{win}{N}}}{2}$$

As described above, Expression (8) for calculating the ICI includes the fixed component and the variation component. Thus, in the present embodiment, a synthesizing unit that synthesizes the fixed components in the ICI1($m$) and the ICI2($m$) according to an addition amount (hereinafter, referred to as a "guard addition amount") of the guard interval G is disposed in the ICI removing unit 9.

Further, in the present embodiment, the ICI removing unit 9 is configured to calculate the ICI that has to be removed from the FFT-processed broadcast signal based on the fixed component which is common in the ICI1($m$) and the ICI2($m$) and the fixed component synthesized by the synthesizing unit. Thus, the ICI removing unit 9 needs not to individually calculate the ICI1($m$) and ICI2($m$).

Further, in the present embodiment, the guard addition amount occupies 50% of the entire tail part of the FFT-processed broadcast signal Sig6. For this reason, the ICI removing unit 9 performs the synthesis by arithmetically averaging the fixed component in the ICI1($m$) and the fixed component in the ICI2($m$). Then, the ICI removing unit 9 calculates the ICI by multiplying the synthesized fixed component by the variation component which is common in the ICI1($m$) and the ICI2($m$).

As described above, the ICI removing unit 9 can calculate the ICI that has to be removed from the FFT-processed broadcast signal Sigh by a relatively simple and small arithmetic circuit that performs the arithmetic process of Expression (8) without individually calculating the ICI1($m$) and the ICI2($m$).

Figure 3:
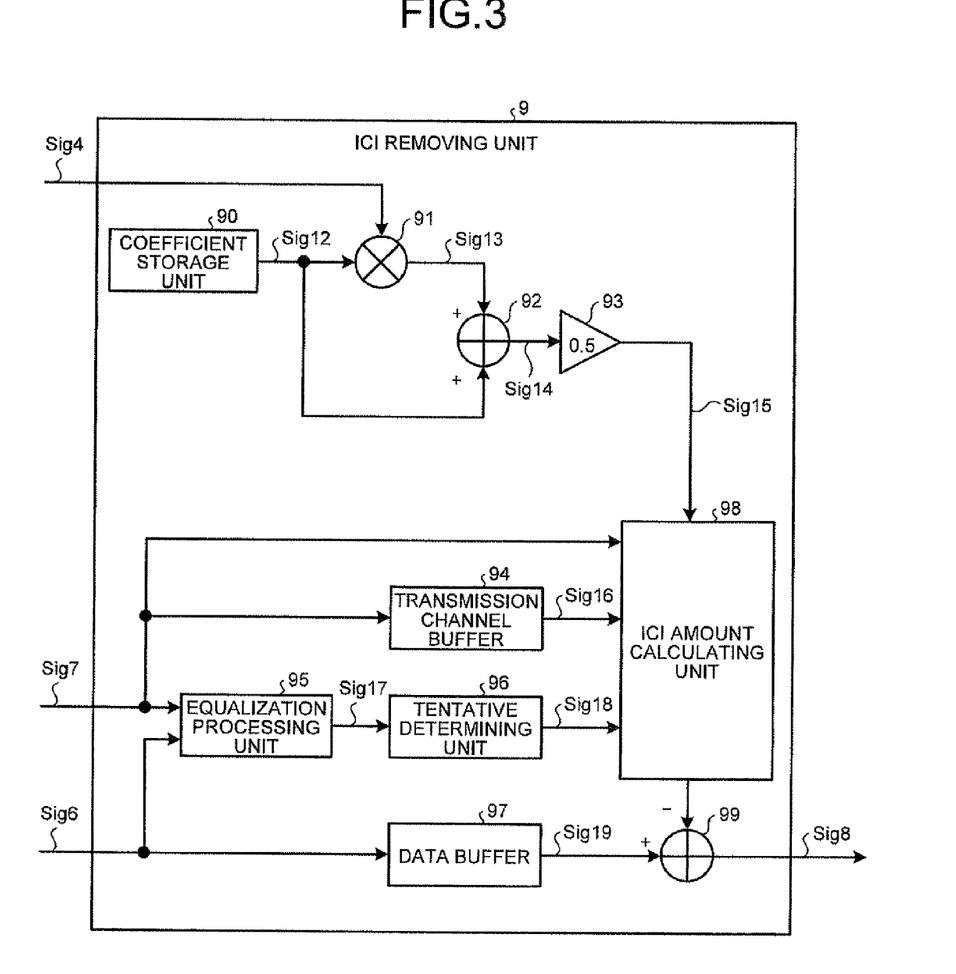
FIG. 3 is a schematic diagram illustrating a configuration of an ICI removing unit according to an embodiment.

Next, a configuration of the ICI removing unit 9 that performs the arithmetic process of Expression (8) and calculates the ICI that has to be removed from the FFT-processed broadcast signal Sig6 will be described with reference to FIG. 3. FIG. 3 is a schematic diagram illustrating a configuration of the ICI removing unit 9 according to an embodiment.

As illustrated in FIG. 3, the ICI removing unit 9 includes a coefficient storage unit 90, a multiplying unit 91, an adding unit 92, an amplifying unit 93, a transmission channel buffer 94, an equalization processing unit 95, a tentative determining unit 96, a data buffer 97, an ICI amount calculating unit 98, and a subtracting unit 99.

The coefficient storage unit 90 is a storage unit that stores a coefficient $\zeta_k$ (k=n−m) which is common in the fixed component included in the ICI in the broadcast signal Sig31 FFT-processed without considering the guard adding position win and the fixed component included in the ICI in the broadcast signal Sig32 FFT-processed in view of the guard adding position win.

Specifically, the coefficient storage unit 90 stores a coefficient $\zeta_k$ (k=n−m=−10, −9, ... 0, ... 9, and 10) which is fixed between carriers in Expression (8). Here, n in the coefficient $\zeta_k$ is a carrier number of the effective symbol D which is an ICI calculation target, and m is a carrier number of another effective symbol D that exerts influence of ICI over the effective symbol D of the carrier number n.

As described above, the coefficient storage unit 90 stores the coefficient $\zeta_k$ for each difference between the carrier number n and the carrier number m. Further, in order to reduce a calculation amount in the ICI removing unit 9, the coefficient storage unit 90 according to the present embodiment stores 20 coefficients corresponding to the difference between the carrier numbers n and m in view of the ICI leaked from 10 carriers at the left and right (ahead of and behind) of the carrier which is the ICI calculation target.

Upon receiving the signal Sig4 from the guard adding unit 5, the multiplying unit 91 acquires information Sig12 corresponding to the coefficient $\zeta_k$ from the coefficient storage unit 90, performs a predetermined multiplication process, and outputs a multiplication result Sig13 expressed by the following Expression (9) to the adding unit 92.

[Expression 8]

$$Sig13: \zeta_k e^{-j2\pi k \frac{win}{N}} \quad (9)$$

Upon receiving the multiplication result Sig13 from the multiplying unit 91, the adding unit 92 acquires information Sig12 corresponding to the coefficient from the coefficient storage unit 90, performs a predetermined addition process, and outputs an addition result Sig14 expressed by the following Expression (10) to the amplifying unit 93.

[Expression 10]

$$Sig15: \frac{\zeta_k + \zeta_k e^{-j2\pi k \frac{win}{N}}}{2} \quad (11)$$

Upon receiving the addition result Sig14 from the adding unit 92, the amplifying unit 93 amplifies the addition result Sig14 0.5 times, and outputs an amplification result Sig15 expressed by the following Expression (11) to the ICI amount calculating unit 98.

[Expression 9]

$$Sig14: \zeta_k + \zeta_k e^{-j2\pi k \frac{win}{N}} \quad (10)$$

As described above, the ICI removing unit 9 functions as the synthesizing unit that synthesizes the fixed components fixed between carriers in the ICI1 and ICI2 in cooperation with the coefficient storage unit 90, the multiplying unit 91, the adding unit 92, and the amplifying unit 93 according to the guard addition amount.

Upon receiving the transmission channel response Sig7 from the transmission channel calculating unit 8, the transmission channel buffer 94 delays the transmission channel response Sig7 by a predetermined time, and then outputs the delayed transmission channel response Sig16 to the ICI amount calculating unit 98. Further, the transmission channel response Sig7 which has not been delayed is input from the transmission channel calculating unit 8 to the ICI amount calculating unit 98.

In the present embodiment, as an example, the ICI removing unit 9 is configured such that a transmission channel response Sig7 of an immediately previous symbol and a transmission channel response Sig16 of an immediately next symbol are input to the ICI amount calculating unit 98. Through this configuration, the ICI amount calculating unit 98 can calculate the time variation Δhn of the transmission channel response in Expression (7).

Upon receiving the FFT-processed broadcast signal Sigh from the FFT unit 7, the equalization processing unit 95 performs waveform equalization on the broadcast signal Sig6, and outputs a broadcast signal Sig17 which has been subjected to the waveform equalization to the tentative determining unit 96.

The equalization processing unit 95 performs waveform equalization such that the phase and amplitude of the SP signal, at the time of transmission, which is included in the broadcast signal Sig6 are reconstructed by multiplying the broadcast signal Sig6 input from the FFT unit 7 by a reverse characteristic of the transmission channel response Sig7 input from the transmission channel calculating unit 8.

Upon receiving the broadcast signal. Sig17, which has been subjected to the waveform equalization, from the equalization processing unit 95, the tentative determining unit 96 estimates the transmission signal $a_n$ which is the broadcast signal Sig17 at the time of transmission by tentatively determining the broadcast signal Sig17 based on the difference between the SP signal before the waveform equalization and the SP signal after the waveform equalization. Then, the tentative determining unit 96 outputs a broadcast signal Sig18 corresponding to the estimated transmission signal $a_n$ to the ICI amount calculating unit 98.

The ICI amount calculating unit 98 assigns the amplification result Sig15 (see Expression 11), the time variation Δhn of the transmission channel response, the broadcast signal Sig18 corresponding to the transmission signal $a_n$ to Expression (7), calculates the ICI that has to be removed from the FFT-processed broadcast signal Sig6, and outputs the ICI to the subtracting unit 99.

Upon receiving the FFT-processed broadcast signal Sig6 from the FFT unit 7, the data buffer 97 delays the broadcast signal Sig6 by a predetermined time, and outputs the delayed broadcast signal Sig19 to the subtracting unit 99.

Here, the data buffer 97 outputs a broadcast signal Sig19, which is obtained by delaying the broadcast signal Sig6 by a time from when the signal Sig4 representing the guard adding position win is input to the multiplying unit 91 to when the amplifying unit 93 outputs the amplification result Sig15, to the subtracting unit 99.

As a result, the broadcast signal Sig19 and the ICI amount which correspond to the same symbol received at the same time are input from the data buffer 97 and the ICI amount calculating unit 98 to the subtracting unit 99, respectively.

The subtracting unit 99 generates the broadcast signal Sig8 from which the ICI is removed by subtracting the ICI input by the ICI amount calculating unit 98 from the broadcast signal Sig19 input by the data buffer 97, and then outputs the generated broadcast signal Sig8 to the equalization processing unit 10.

As described above, the ICI removing unit 9 synthesizes the fixed components fixed between carriers in the ICI1 and the ICI2 according to the guard addition amount, and calculates the ICI that has to be removed from the FFT-processed broadcast signal based on the synthesized fixed component.

Here, returning to FIG. 1, the description of the receiving device 1 continues. The broadcast signal Sig8 from which the ICI has been removed by the ICI removing unit 9 is input to the equalization processing unit 10. Further, the transmission channel response Sig7 is input from the transmission channel calculating unit 8 to the equalization processing unit 10.

The equalization processing unit 10 is a processing unit that performs the same equalization process as in the equalization processing unit 95 illustrated in FIG. 3 on the broadcast signal Sig8, from which the ICI is removed, input from the ICI removing unit 9 using the transmission channel response Sig7 input from the transmission channel calculating unit 8. The equalization processing unit 10 outputs the broadcast signal Sig9, which has been subjected to the equalization process, to the tentative determination likelihood calculating unit 11.

The tentative determination likelihood calculating unit 11 is a processing unit that performs the same tentative determination as in the tentative determining unit 96 illustrated in FIG. 3 on the broadcast signal Sig9, which has been subjected to the equalization process, input from the equalization processing unit 10, and calculates the likelihood of the tentatively determined broadcast signal. The tentative determination likelihood calculating unit 11 outputs the tentatively determined broadcast signal Sig10 including the calculated likelihood to the error correction TS output unit 12.

The error correction TS output unit 12 is a processing unit that performs a well-known error correction process on the broadcast signal Sig10 using the likelihood included in the tentatively determined broadcast signal Sig10 input from the tentative determination likelihood calculating unit 11, a convolutional code, a Reed-Solomon code, and the like. The error correction. TS output unit 12 outputs an error-corrected TS signal Sig11 to be reproduced through an output reproduction device (not illustrated) such as a display or a speaker.

As described above, the receiving device 1 according to the present embodiment includes the receiving unit 3, the guard adding unit 5, the FFT unit 7, the synthesizing unit, and the ICI amount calculating unit 98. The receiving unit 3 receives the broadcast signal in which the guard interval G copied from the tail part of the effective symbol D including broadcast content is added to the head part of the effective symbol D.

The guard adding unit 5 adds the guard interval G included in the broadcast signal received by the receiving unit 3 to the tail part of the broadcast signal. The FFT unit 7 performs the FFT on the broadcast signal Sig3 to which the guard interval G is added.

The synthesizing unit synthesizes the fixed components, which are fixed between carriers of the effective symbol D, included in the ICI in the broadcast signal Sig32 on which the FFT has been performed in view of the adding position (the guard adding position win) of the guard interval G in the broadcast signal. Sig1 and the ICI in the broadcast signal. Sig31 on which the FFT has been performed without considering the adding position (the guard adding position win), according to the addition amount of the guard interval G.

Then, the ICI amount calculating unit 98 calculates the ICI to be removed from the FFT-processed broadcast signal Sig6 based on the fixed component synthesized by the synthesizing unit.

Through the above-described operation, the receiving device 1 can prevent influence caused by delaying the guard interval G at the time of the guard addition process from being reflected in the ICI, and thus can calculate the ICI that has to be removed from the FFT-processed broadcast signal Sigh with a high degree of accuracy. Thus, the receiving device 1 can improve the ICI calculation accuracy using the guard adding technique and the technique of removing the ICI together.

Further, in the receiving device 1, the ICI amount calculating unit 98 calculates the variation component, which changes for each carrier of the effective symbol D, included in both of the ICI in the broadcast signal Sig32 on which the FFT has been performed in view of the guard adding position win in the broadcast signal Sig1 and the ICI in the broadcast signal. Sig31 on which the FFT has been performed without considering the guard adding position win.

Then, the ICI amount calculating unit 98 calculates the ICI that has to be removed from the FFT-processed broadcast signal Sig6 based on the calculated variation component and the fixed component synthesized by the synthesizing unit. In other words, the receiving device 1 can calculate the ICI that has to be removed from the FFT-processed broadcast signal Sig6 without individually calculating the ICI1 in the broadcast signal Sig32 on which the FFT has been performed in view of the guard adding position win and the ICI 2 in the broadcast signal Sig31 on which the FFT has been performed without considering the guard adding position win.

Through this operation, the receiving device 1 can simplify the circuit configuration of the ICI amount calculating unit 98 and reduce the circuit size, and thus easily implement the receiving device 1 of LSI.

Further, in the receiving device 1, the ICI removing unit 9 includes the coefficient storage unit 90 that stores a coefficient $\zeta_k$ which is common in the fixed component included in the ICI in the broadcast signal Sig31 FFT-processed without considering the guard adding position win and the fixed component included in the ICI in the broadcast signal Sig32 FFT-processed in view of the guard adding position win in the broadcast signal Sig1.

Further, the coefficient storage unit 90 stores the coefficient $\zeta_k$ for each difference (n−m) between the carrier number of the effective symbol D and the carrier number of another effective symbol D that exerts influence of ICI over the effective symbol D.

Through this operation, the receiving device 1 can reduce a processing time necessary to calculate the ICI since it is unnecessary to calculate coefficient $\zeta_k$ each time the ICI that has to be removed from the FFT-processed broadcast signal. Sig6 is calculated.

The above embodiment has been described in connection with the example in which the guard adding unit 5 generates the broadcast signal Sig3 in which each of the data of the copy source of the guard interval G and the data of the guard interval G occupies 50% of the tail part of the effective symbol D, but this is merely an example.

In other words, the guard adding unit 5 may be configured to add the guard interval G of an arbitrary addition amount to the tail part of the effective symbol D. In this configuration, the ICI removing unit 9 is configured to synthesize the fixed component in the ICI1 with the fixed component in the ICI2 at a synthesis rate corresponding to the addition amount of the added guard interval G.

For example, the description will proceed with an example in which the guard adding unit 5 generates the broadcast signal Sig3 in which the ratio of the data of the copy source of the guard interval G and the data of the guard interval G in the tail part of the effective symbol D is 6 to 4.

In this case, in the ICI removing unit 9, the configuration of the synthesizing unit is changed to generate the amplification result Sig15 that includes the fixed component in the ICI1 and the fixed component in the ICI2 by 60% and 40%, respectively.

As described above, when the addition amount of the guard interval G added to the tail part of the effective symbol D is changed, by changing the configuration of the synthesizing unit, the receiving device 1 can calculate the ICI that has to be removed from the FFT-processed broadcast signal Sigh with a high degree of accuracy.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A receiving device, comprising:
   a receiving unit that receives a broadcast signal in which a guard interval copied from a tail part of an effective symbol including broadcast content is added to a head part of the effective symbol;
   a guard adding unit that adds the guard interval included in the broadcast signal received by the receiving unit to the tail part of the broadcast signal;
   a fast Fourier transform (FFT) unit that performs FFT on the broadcast signal to which the guard interval is added;
   a synthesizing unit that synthesizes a fixed component, which is fixed between carriers of the effective symbol, included in inter-carrier interference (ICI) in a broadcast signal on which FFT has been performed in view of an adding position of the guard interval in the broadcast signal and ICI in a broadcast signal on which FFT has been performed without considering the adding position, according to an addition amount of the guard interval; and an ICI calculating unit that calculates ICI to be removed from the broadcast signal on which FFT has been performed based on the fixed component synthesized by the synthesizing unit.

2. The receiving device according to claim 1, wherein the ICI calculating unit calculates a variation component, which changes for each carrier, included in both of the ICI in the broadcast signal on which the FFT has been performed in view of the adding position and the ICI in the broadcast signal on which the FFT has been performed without considering the adding position, and calculates the ICI based on the variation component and the fixed component synthesized by the synthesizing unit.

3. The receiving device according to claim 1, further comprising, a coefficient storage unit that stores a coefficient, which is common in the fixed component, for each difference between a carrier number of the effective symbol and a carrier number of an effective symbol that exerts ICI over the effective symbol.

4. The receiving device according to claim 2, further comprising, a coefficient storage unit that stores a coefficient, which is common in the fixed component, for each difference between a carrier number of the effective symbol and a carrier number of an effective symbol that exerts ICI over the effective symbol.

5. A receiving method, comprising:

receiving a broadcast signal in which a guard interval copied from a tail part of an effective symbol including broadcast content is added to a head part of the effective symbol;

adding the guard interval included in the received broadcast signal to a corresponding tail part of the broadcast signal;

performing fast Fourier transform (FFT) on the broadcast signal to which the guard interval is added;

synthesizing a fixed component, which is fixed between carriers of the effective symbol, included in inter-carrier interference (ICI) in a broadcast signal on which FFT has been performed in view of an adding position of the guard interval in the broadcast signal and ICI in a broadcast signal on which FFT has been performed without considering the adding position, according to an addition amount of the guard interval; and calculating ICI to be removed from the broadcast signal on which FFT has been performed based on the fixed component synthesized according to the addition amount of the guard interval.

* * * * *